United States Patent [19]
Sasaki et al.

[11] Patent Number: 5,137,463
[45] Date of Patent: Aug. 11, 1992

[54] CLOCK SPRING

[75] Inventors: Kunihiko Sasaki; Masanori Kuramoto, both of Miyagi, Japan

[73] Assignee: Alps Electric Co., Ltd., Tokyo, Japan

[21] Appl. No.: 756,942

[22] Filed: Sep. 9, 1991

[30] Foreign Application Priority Data

Sep. 20, 1990 [JP] Japan .................... 2-98087[U]

[51] Int. Cl.$^5$ ................... H01R 13/46; H01R 39/02
[52] U.S. Cl. .......................... 439/164; 439/15
[58] Field of Search ..................... 439/15, 164, 165

[56] References Cited

U.S. PATENT DOCUMENTS 4,925,122  5/1990  Bannai ..................... 439/15 X
4,936,782  6/1990  Bannai et al. ............. 439/15

Primary Examiner—Eugene F. Desmond
Attorney, Agent, or Firm—Guy W. Shoup; David W. Heid

[57] ABSTRACT

The present invention relates to a clock spring used for the steering system of an automobile or the like in which a flexible cable is utilized to make an electrical connection between a fixed member and a movable member. The clock spring includes a stationary housing; a rotor rotatably mounted to the stationary housing; the flexible cable wound in a cable accommodating portion defined between the stationary housing and the rotor; and a cover fixed to the stationary housing so as to cover the opened end of the cable accommodating portion. The improvement of this invention resides in a construction by which ribs are provided in the cable accommodating portion to restrict the flexible cable to a position more in the inner periphery of the rotor than in the outer periphery of the same.

8 Claims, 2 Drawing Sheets

CLOCK SPRING

BACKGROUND OF THE INVENTION

1. Field of the Invention

The present invention relates to a clock spring in which a flexible cable is utilized to make an electrical connection between a fixed member and a movable member. More particularly, it relates to a type of clock spring in which the fixed member is composed of a stationary housing and a cover that are formed integrally with each other, and the movable member or rotor is rotatably attached to the stationary housing and the cover.

2. Description of the Related Art

FIG. 5 is a cross-sectional view showing a conventional clock spring. In the drawing, numeral 1 denotes a rotor equipped with a disk-like top plate 2 and a cylindrical inner ring wall 3 which is vertically provided at the center of the top plate 2. An indentation 4 is formed at the outer periphery of the top plate 2. Numeral 5 denotes a stationary housing provided with a cylindrical outer ring wall 6 and a brim 7 projecting inwardly from the upper end of the outer ring wall 6. The brim 7 and the indentation 4 of the top plate 2 overlap each other. Numeral 8 denotes a disk-like cover secured to the lower end of the outer ring wall 6 by means of an appropriate fixing method, such as heat caulking or rivets. The cover 8 closes a cable accommodating portion 9 defined between the rotor 1 and the stationary housing 5. The rotor 1, the stationary housing 5 and the cover 8 all form the shell of the clock spring. The rotor 1, which is a movable member, is rotatably coupled to the stationary housing 5 and the cover 8, which constitute a fixed member. Numeral 10 denotes a flat cable made of a plurality of conductors that are laminated by a pair of resin films. It is contained in the cable accommodating portion 9 while the flat cable 10 is coiled a plurality of turns. The ends of the flat cable 10 on the inner and outer peripheries thereof are respectively secured to the rotor 1 and the stationary housing 5, and are then led outside.

The rotor 1 is secured to the side of the steering wheel of the steering system of an automobile, whereas the stationary housing 5 and the cover 8 are secured to the fixing side of the body of the automobile. In such a state, the clock spring constructed as described above is employed. When the turning force of the steering wheel rotates the rotor either clockwise or counterclockwise, the flat cable 10 is either wound around the inner ring wall 3 of the rotor 1 or rewound around the outer ring wall 6 of the stationary housing 5. In either case, an electric connection between the movable member (rotor 1) and the fixed member (stationary housing 5 and cover 8) is made through the flat cable 10.

Because of the construction of the conventional clock spring in which the movable member or rotor 1 is rotatably attached to the fixed member, composed of the stationary housing 5 and the cover 8, a clearance (space indicated by S in FIG. 5) must be formed in the portion where the movable and fixed members are joined together, that is, between the outer circumference of the top plate 2 of the rotor 1 and the internal peripheral surface of the outer ring wall 6 of the stationary housing 5. The clearance S formed between the rotor and the stationary housing serves to absorb any dimensional and mounting errors of the parts of the clock spring. However, because of this clearance while the flat cable 10 is being wound or rewound, if vibration is applied to the clock spring from the outside, the extreme end of the flat cable 10 on the outer periphery thereof enters the clearance S. The upper and lower ends of the flat cable 10 along its width direction strike against the brim 4 or the cover 8, thus producing unpleasant noise.

SUMMARY OF THE INVENTION

The present invention has been made in view of such a problem of the conventional art. The object of the invention is to provide a clock spring capable of reducing noise.

To achieve the above object, this invention provides a clock spring comprising: a stationary housing; a rotor rotatably mounted with respect to the stationary housing; a flexible cable wound in a cable accommodating portion defined between the stationary housing and the rotor; and a cover fixed to the stationary housing so as to cover an opened end of the cable accommodating portion; wherein the flexible cable makes an electrical connection between the stationary housing and the rotor; wherein ribs are provided in the cable accommodating portion; and wherein because of the ribs, the flexible cable is positioned more in the inner periphery of the rotor than the outer periphery of the rotor.

Because of the ribs, the flexible cable does not come into contact with the internal peripheral surface of the stationary housing. The flexible cable, therefore, will not enter the clearance required between the stationary housing and the outer periphery of the rotor. Noise attributable to the vibration of the flexible cable is reduced.

DESCRIPTION OF THE PREFERRED EMBODIMENTS

The embodiments of the present invention will be described below with reference to the drawings.

Figure 1:
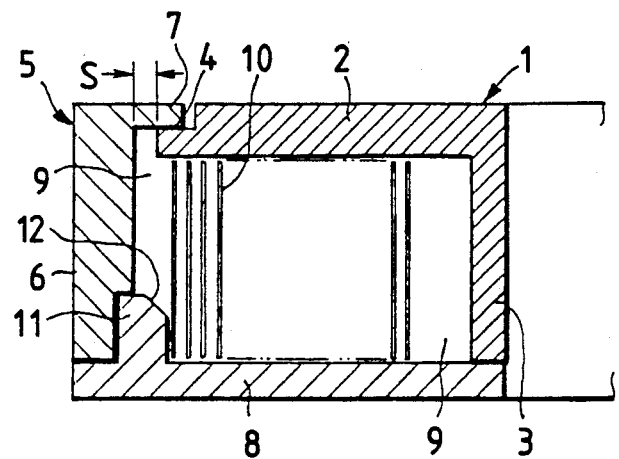
FIG. 1 is a cross-sectional view essentially showing a clock spring according to a first embodiment of the present invention.
Figure 5:
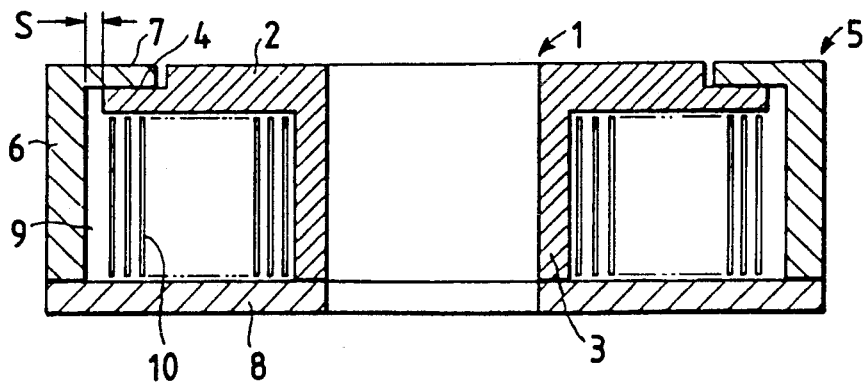
FIG. 5 is a cross-sectional view essentially showing the conventional clock spring.

FIG. 1 is a cross-sectional view essentially showing a clock spring according to a first embodiment of the invention, in which parts corresponding to those in FIG. 5 are denoted by the same numerals. A plurality of ribs 11 extending in the direction of a cable accommodating portion 9 are disposed close to the outer periphery of a cover 8. This is a feature of the first embodiment that differs from that of the conventional clock spring mentioned above. The construction of this clock spring is the same as that of the conventional one, except for the ribs 11. For example, three or four ribs 11 are arranged at predetermined intervals in the circumferential direction of a rotor 1. The inner wall of each rib 11 is positioned closer to the center of the rotor 1 than the outer periphery of the top plate 2, (that is, close to the rotation center of the rotor 1). Therefore, the extreme end of the flat cable 10 to be wound comes into contact with the inner wall of the ribs 11, and is limited so as not to reach a clearance S. It is thus possible to reduce noise caused by the flat cable moving up and down in the clearance S. The end of each rib 11 is shaped into a tapered portion (chamfered portion) 12. During the assembly of the clock spring, the flat cable 10 extends toward an outer ring wall 6. During the final step of adhesion of the cover 8, however, the tapered portion 12 is capable of automatically drawing the extended flat cable 20 toward the inside of the rotor 1, thus rendering the assembly operation simple.

Figure 2:
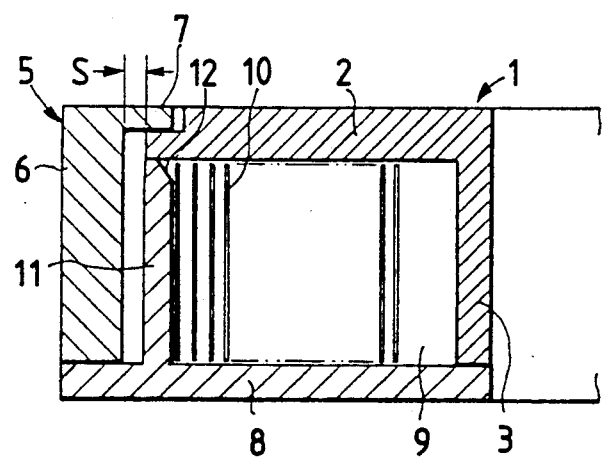
FIGS. 2, 3 and 4 are cross-sectional views essentially showing clock springs according to second, third and fourth embodiments of this invention.

FIG. 2 is a cross-sectional view essentially showing a clock spring according to a second embodiment of this invention, in which parts corresponding to those in FIG. 1 are identified by the same numerals.

In the second embodiment, the ribs 11 extend immediately under the lower surface of the top plate 2 of the rotor 1. Each rib 11 is set so that its height is a little greater than the width of the flat cable 10. For this reason, the ribs 11 can prevent the top plate 2 of the rotor 1 from being deformed in the direction of the cable accommodating portion 9. It is thus possible to solve the problem of an increased rotation torque caused by the flat cable 10 pressing against the top plate 2. In addition to the advantage of the first embodiment, the second embodiment thus exhibits the advantage of preventing an increase in the rotation torque.

Figure 3:
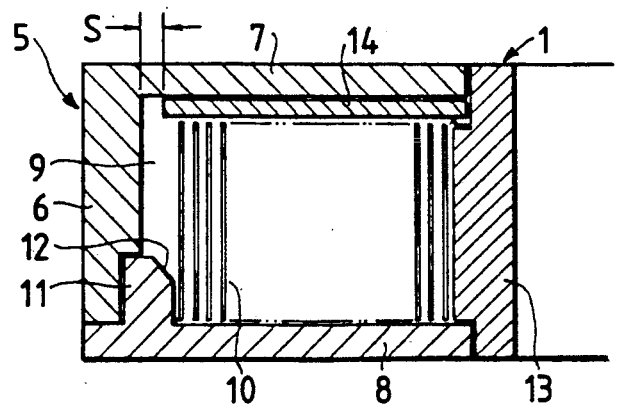

FIG. 3 is a cross-sectional view essentially showing a clock spring according to a third embodiment of this invention, in which parts corresponding to those in FIG. 1 are designated by the same numerals.

The third embodiment differs from the first embodiment in that a rotor 1 is composed of a cylindrical body 13 and a suspension sheet 14 fixed to the upper portion of the cylindrical body 13. The construction of the third embodiment is the same as that of the first embodiment, except for such a rotor 1. The suspension sheet 14 is formed of a thin board made of synthetic resin, metal or the like. It elastically controls an up/down motion of the flat cable 10, and is a part of the movable member. A clearance S is therefore required between the outer periphery of the suspension sheet 14 and an outer ring wall 6 of a stationary housing 5. Also, in the case of the third embodiment, the ribs 11 prevent the flat cable 10 from entering the clearance S, thereby reducing noise.

Figure 4:
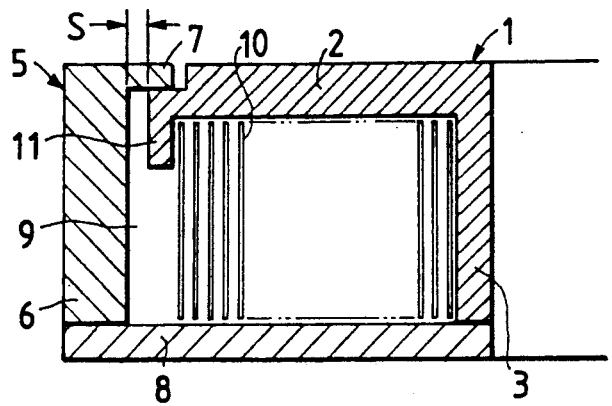

FIG. 4 is a cross-sectional view essentially showing a clock spring according to a fourth embodiment of this invention, in which parts corresponding to those in FIG. 1 are denoted by the same numerals. In the fourth embodiment, ribs 11 dangle from the outer periphery of a top plate 2 of a rotor 1. This is a feature of the fourth embodiment that differs from those of the first to third embodiments. In this way, when the ribs 11 are provided on the side of the rotor 1, instead of on the side of a cover 8, the ribs 11 can also prevent the flat cable 10 from extending. It is thus possible to decrease noise caused by the flat cable 10 moving up and down in the clearance S.

As has been described above, according to the present invention, because the ribs are provided which prevent the flexible cable from entering the clearance required between the stationary housing and the outer periphery of the rotor, it is possible to provide a clock spring which reduces noise caused by the flexible cable vibrating in the clearance.

What is claimed is:

1. A clock spring comprising:
    a stationary housing;
    a rotor rotatably mounted with respect to said stationary housing;
    a flexible cable wound in a cable accommodating portion defined between said stationary housing and said rotor; and
    a cover fixed to said stationary housing so as to cover an opened end of said cable accommodating portion;
    wherein said flexible cable makes an electrical connection between said stationary housing and said rotor;
    wherein ribs are provided in said cable accommodating portion; and
    wherein said ribs are provided in said cable accommodating portion so as to prevent one breadthwise end of said flexible cable from entering a clearance formed between said rotor and said stationary housing.

2. A clock spring according to claim 1, wherein said ribs are provided on said cover.

3. A clock spring according to claim 1, wherein said ribs are provided near the outer periphery of said rotor.

4. A clock spring according to claim 1, 2 or 3, wherein the heights of said ribs are set so as to be greater than the width of said flexible cable.

5. A clock spring according to claim 2, wherein tapers are provided at the ends of said ribs.

6. A clock spring comprising:
    a stationary housing;
    a rotor rotatably mounted to said stationary housing, said rotor having a cylindrical portion having a first end disposed adjacent said stationary housing and a top plate fixedly connected to a second end of said cylindrical portion, said top plate having an outer edge;
    a flexible cable wound in a cable accommodating portion defined between said stationary housing and said top cover;
    a substantially cylindrical cover having a first end fixedly connected to said stationary housing, an internal peripheral surface facing said cable accommodating portion, and a second end disposed adjacent said outer edge of said top plate such that a gap is defined between said outer edge of said rotor and said internal peripheral surface; and
    a rib disposed between said flexible cable and said cylindrical cover such that said flexible cable is prevented from contacting any portion of said internal peripheral surface.

7. A clock spring of claim 6 wherein said rib is fixedly connected to said stationary housing.

8. A clock spring of claim 6 wherein said rib is fixedly connected to said top plate.

* * * * *